UNITED STATES PATENT OFFICE.

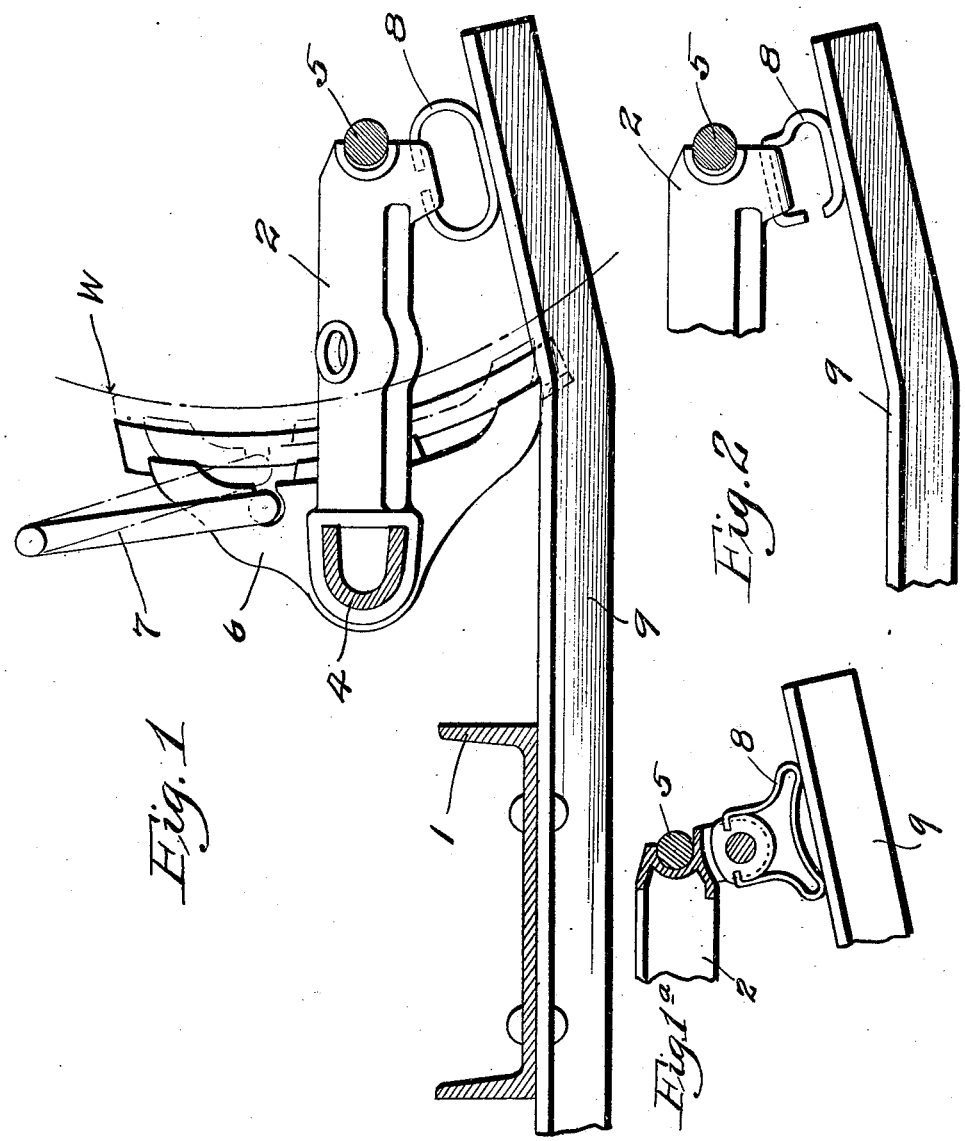

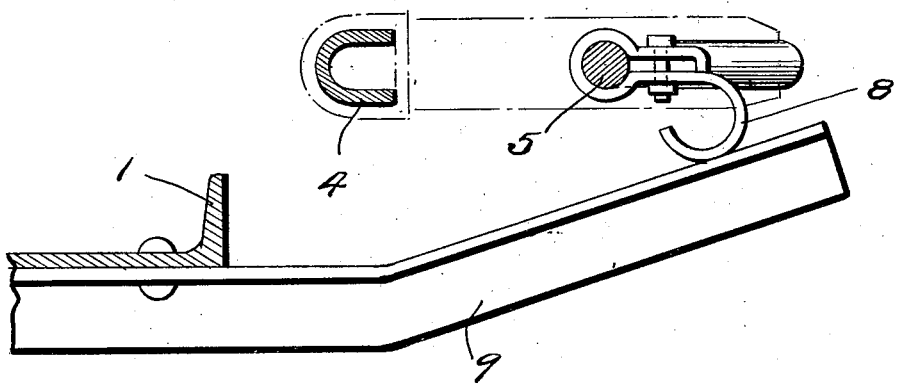
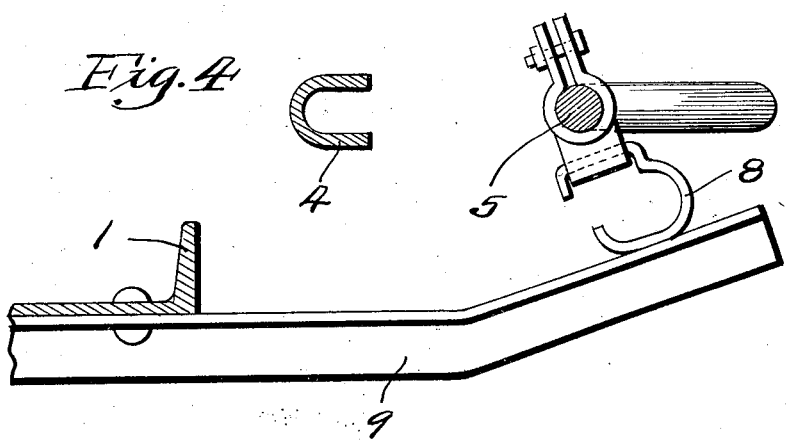
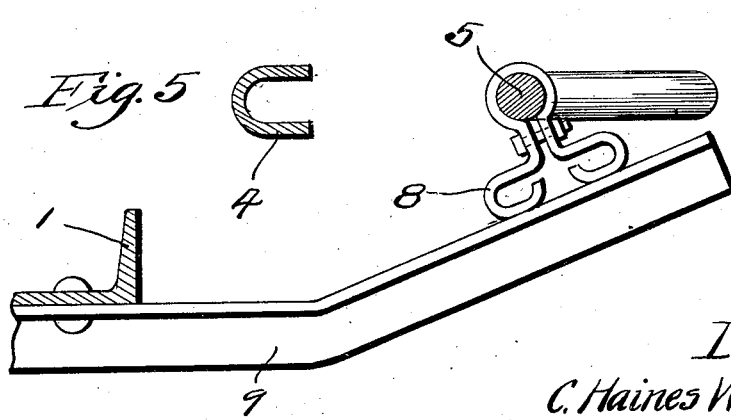

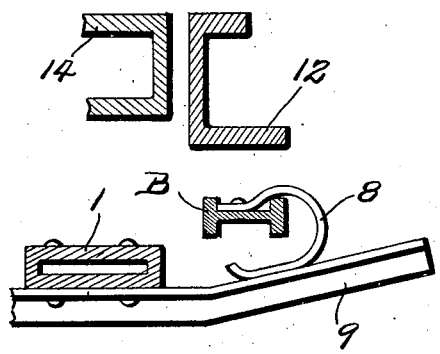
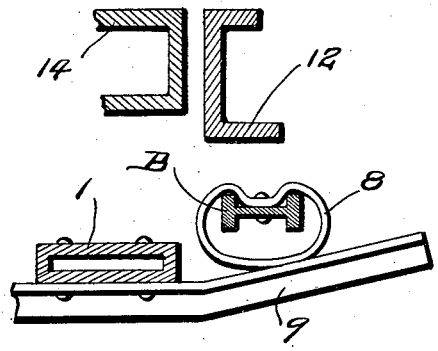
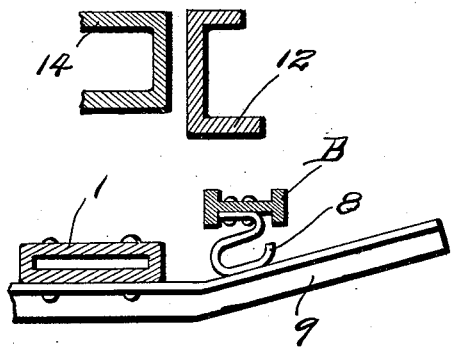
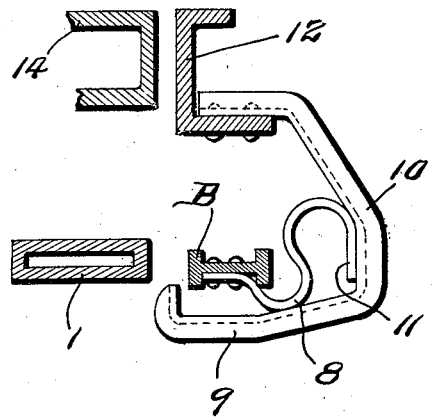
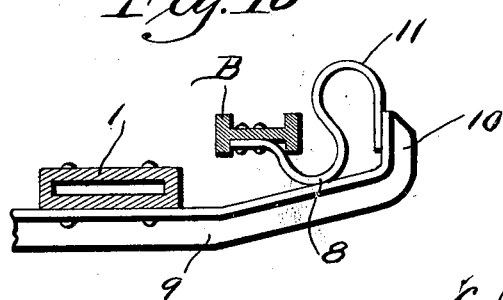

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM SUPPORT.

1,369,867. Specification of Letters Patent. Patented Mar. 1, 1921.

Continuation of application Serial No. 148,551, filed February 14, 1917. This application filed May 11, 1917. Serial No. 167,867.

*To all whom it may concern:*

Be it known that I, CHARLES HAINES WILLIAMS, a citizen of the United States, residing at the city of Chicago, county of Cook, and State of Illinois, have invented a certain new and useful Improvement in Brake-Beam Supports, of which the following is a full, clear, and exact description, such as will enable others skilled in the art to which it appertains to make and use the same, reference being had to the accompanying drawings, forming part of this specification.

This invention relates to railway car truck equipment, and specifically to an improvement in the means for supporting and guiding the brake beam.

As is well known in the art, the gear for transmitting movement to the brakes is supported by the brake beams which, in turn, are carried by hangers supported on the truck frame.

In addition to this means of support, it is well known practice to employ what is called a third or fourth point support, consisting of an arrangement for supporting a beam while permitting its movement relative to the wheels in braking operations, and for properly guiding the beam to insure the accurate application and removal of the brake shoes from the wheels.

In a copending application, Serial Number 148,551, filed February 14, 1917, I have disclosed and claimed broadly the subject matter of the present application, and accordingly, this application is a continuation of that one, being directed to subject matter not specifically claimed in it.

The broad object of the present invention is to provide an improved beam supporting construction wherein a safety device is provided for catching and securely retaining the beam in the event of its detachment from the hangers which form its normal supporting means, and at the same time to afford, partially by means of portions which form this safety support, an effective third or fourth point support arrangement which will guide the beam accurately in braking movements, afford the proper play and movement of the beam to insure the accurate placing and displacing of the shoes relative to the wheels, and assists in the throwing off of the brakes from the wheels.

More specifically, the object of the present improvement is to provide a brake beam of novel construction adapted to coöperate with a rigid safety supporting member in such fashion as to afford the proper third or fourth point supporting and guiding operation.

Other objects will be obvious or pointed out hereinafter, reference being had to the accompanying drawings in which—

Figure 1 is a detail of portions of a truck and brake rigging embodying my invention, certain transverse members being shown in vertical section, and certain other parts being shown in elevation;

Fig. 1ª is a detail of a modified form illustrating my invention used as a third point support;

Fig. 2 is a similar detail of a second modified form;

Fig. 3 is a similar detail of a third modified form in which the arrangement is such as to provide a fourth point support;

Fig. 4 is a fourth modification for a fourth point support;

Fig. 5 is a fifth modification for a fourth point support;

Figs. 6, 7, 8, 9 and 10 show still further modifications which may be either third or fourth point supports.

Referring to these illustrations by means of the characters of reference applied, let it be understood that 1 represents generally the spring plank of the truck, the same being shown in vertical section, 2 represents the strut of the brake beam, 4 represents the compression member and 5 the tension member of the beam; 6 represents the brake head, and 7 designates the hanger attached to the head so as to support the beam and parts carried thereby. This hanger may be attached to a portion of the truck frame in any of the conventional fashions. If the beam is to be arranged for a third point of support, the strut is provided with a resilient member 8 carried adjacent the tension member of the beam, which resilient member may be in any convenient form, such as in the form of a strip of spring metal shaped to provide a flexible and elastic supporting member. Attached to a truck portion independently of the brake beam and independently of the normal supporting means of the brake beam, is a supporting member 9, which preferably is in the form of a rigid bar of suitable cross section to provide an upper bearing surface. This supporting member is so arranged as to extend below the brake beam, and may be bent to have the proper direction relative to the axle of the wheels to provide the proper guiding support for the beam. The beam finds support upon the supporting member 9 through the instrumentality of the resilient member 8, which is arranged to have slidable bearing upon the upper supporting surface of the supporting member. By virtue of this arrangement the beam may move freely with a sliding movement on the supporting member toward and from the wheels, as is necessary in application and removal of the brakes, and at the same time the beam is permitted to have the necessary slight movement toward and from the supporting member 9 incident to the stressing of the brakes upon the wheels, such movement being desirable in permitting the shoes to be properly accommodated to the wheels to insure even wear and uniform contact. The reaction of the resilient member 8, upon the release of the brakes, functions to assist in the throwing off of the shoes from the wheels. In this fashion, it will be observed that the supporting member 9 contributes to the guiding function obtainable with the third or fourth point support arrangement. The supporting member 9 has the further function, however, of providing a safety support such as will be effective to catch the beam in case of its detachment from its normal supporting means, and prevent its falling under the wheels.

In the form illustrated in Figs. 1 and 2 I have shown the invention as forming a third point support. In Figs. 3, 4, and 5 I have shown the invention as forming a fourth point support. In this arrangement, there are two of the supporting members 9, one disposed at each side of the strut, and a transverse member of the beam, such as the tension member 5, is provided with two attachments each including a resilient member 8, and which latter are designed to find support and guidance upon the associated supporting members 9. This arrangement functions in the manner above described with reference to the third point support arrangement.

In case a solid beam, as distinguished from a trussed beam, is employed, my improvement may be embodied therewith in a variety of forms, certain ones of which are illustrated in Figs. 6 to 10 inclusive. In these figures, I have designated the beam by the character B. In the forms shown in Figs. 9 and 10, the device includes a yielding pressure member 11 which has bearing against a stop member 10 so that, upon the movement of the beam in the application of the brakes, the member 11 is placed under compression against the stop member 10, and upon the release of the brakes the expansion of the pressure member 11 operates to assist in the throw off of the brakes.

In the modification illustrated in Fig. 9, I show the supporting member 9 as attached to a portion 12 of the truck frame, instead of to the spring plank 1, said member 12 being any convenient frame portion, such as a transom or bolster guide. In the forms illustrated in Figs. 6 to 9, the truck bolster is indicated by the numeral 14.

From the foregoing, it is to be observed that my invention may be embodied in a great variety of forms, and it is to be understood that all of those herein shown are intended to be illustrative of the invention, and not definitive of its range of variation, the appended claims being intended to comprehend all various embodiments.

What I claim is:

1. In a truck, the combination of a brake beam, a safety supporting member attached to a truck portion independently of the beam, and a resilient member carried by the beam and coöperating with the supporting member to afford guidance for the beam in braking operations.

2. In a truck, the combination of a brake beam mounted for movement, a safety supporting member affixed to a portion of a truck independently of the beam attachment, and a resilient member carried by the beam and arranged for sliding support upon the supporting member, the flexibility of said resilient member permitting its movement toward the supporting member under braking stresses.

3. In a truck, the combination of a beam mounted for oscillatory movement on the truck, a safety supporting member adapted to sustain the weight of the beam attached to the truck independently of the beam mounting and disposed in position to receive the same in the event of its detachment from its normal supporting means, and a resilient member carried by the beam and coöperating with the supporting member for sliding movement longitudinally thereof, to guide the beam in braking movements.

4. In a car truck, the combination of a swinging brake beam, a bar underlying said beam, and a resilient member fixedly secured to said beam at one end and slidably engaging said bar at the other end, substantially as described.

5. A third or fourth point support for brake beams comprising a clamping member having legs and designed to be secured to a part of the brake beam, and a rubbing shoe formed integral with one of the legs of the clamping member.

6. A third or fourth point support for brake beams comprising an eye portion adapted to embrace a part of the brake beam, clamping legs extending from said eye portion, and a rubbing shoe integral with one of said clamping legs.

In testimony whereof I hereunto affix my signature in the presence of two witnesses, this 26" day of April, 1917.

CHARLES HAINES WILLIAMS.

Witnesses:
 E. T. WALKER,
 M. F. HUNTOON.